United States Patent [19]
Sharp et al.

[11] Patent Number: 5,666,373
[45] Date of Patent: Sep. 9, 1997

[54] LASER HAVING A PASSIVE PULSE MODULATOR AND METHOD OF MAKING SAME

[75] Inventors: Richard C. Sharp, Wayland; Derek E. Spock, Watertown; Noren Pan, Newton, all of Mass.

[73] Assignee: Raytheon Company, Lexington, Mass.

[21] Appl. No.: 597,330

[22] Filed: Feb. 6, 1996

[51] Int. Cl.$^6$ .................... H01S 3/098; H01L 21/70
[52] U.S. Cl. .................... 372/18; 372/6; 372/25; 372/26; 372/92; 372/96; 372/99; 372/108; 438/27; 438/29; 438/32
[58] Field of Search .................... 372/6, 7, 9, 10, 372/11, 18, 19, 21, 22, 23, 25, 26, 28, 30, 43, 50, 92, 98, 99, 96, 108; 437/51, 126, 129

[56] References Cited

U.S. PATENT DOCUMENTS

| | | | |
|---|---|---|---|
| 5,237,577 | 8/1993 | Keller et al. | 372/11 |
| 5,265,107 | 11/1993 | Delfyett, Jr. | 372/11 |
| 5,278,855 | 1/1994 | Jacobovitz-Veselka et al. | 372/44 |
| 5,283,799 | 2/1994 | Jacquet et al. | 372/50 |
| 5,450,427 | 9/1995 | Fermann et al. | 372/18 |
| 5,488,620 | 1/1996 | Minden | 372/18 |

OTHER PUBLICATIONS

Islam, IEEE Journal of Quantum Electronics, Color Center Lasers Passively Mode Locked by Quantum Wells, vol. 25, 1989.

Silberberg and Smith, Appl. Phys. Lett., Fast Nonlinear Optical Response from Proton–bombarded Multiple Quantum Well Structures, Lett. 46, 1985.

Smith et al., J. Opt. Soc. Am. B, Mode Locking of Semiconductor Diode Lasers Using Saturable Excitonic Monlinearities, vol. 2, 1985.

Keller et al., Optics Letters, Solid–State Low–Loss Intracavity Saturable Absorber for Nd:YLF Lasers: An Antiresonant Semiconductor Fabry–Perot Saturable Absorber, vol. 17. 1992.

(List continued on next page.)

*Primary Examiner*—Brian Healy
*Attorney, Agent, or Firm*—Donald F. Mofford

[57] ABSTRACT

A laser having a gain medium disposed in a resonant cavity having a pair of end reflectors. One of such reflectors has a reflectivity lower than the reflectivity of the other one of the reflectors. The reflectors are arranged to provide a single ended output for the cavity through the one of the reflectors having the lower reflectivity. A saturable absorber is formed on the one of the reflectors having the lower reflectivity. With such an arrangement, fabrication of the saturable absorber on the single ended output coupler is greatly simplified. The gain medium is a doped fiber and the saturable absorber formed on the one of the reflectors having the lower reflectivity is affixed to an end of the doped fiber gain medium. With such an arrangement, a highly efficient, relatively low cost, mode locked laser is provided.

26 Claims, 2 Drawing Sheets

OTHER PUBLICATIONS

Keller et al., Optuics Letters, Self–Starting and Self––Q–Switching Dynamics of Passively Mode–Locked Nd:YLF and Nd:YAG Lasers, vol. 18, 1993. Optics Lett.

Weingarten, Optics Letters, Passively Mode–Locked Diode–Pumped Solid–State Lasers That Use an Antiresonant Fabry–Perot Saturable Absorber, Optics Lett. vol. 18, 1993.

Reddy et al., A. Turnkey 1.5 µm Picosecond Er/Yb Fiber Laser, Paper PD–17 at the Postdeadline Session of the Optical Fibers Conference, San Jose, CA, Feb. 25, 1993.

Tuesday, May 10, CLEO '94, (backTwo Pages Handwritten Notes).

Raytheon Research Division, Mode–Locked Erbium Fiber Laser to be Presented at OFC/IOOC '93, Feb. 21–26, 1993.

Loh, et al., IEEE Photonics Technology Letters, Passively Mode–Locked $Er^{3+}$ Fiber Laser Using a Semiconductor Nonlinear Mirror, vol. 5, 1993.

Loh et al., Appl. Phys. Lett., ALI–Solid–State Subpicosecond Passively Mode Locked Erbium–Doped Fiber Laser, vol. 63, 1993.

Raytheon Research Division, Mode–Locked Erbium Fiber Laser Presented at OSA Annual Meeting, Sep. 20–25, 1992.

De Souza et al., Electronics Letters, Saturable Absorber Mode Locked Polarisation Maintaining Erbium–Doped Fibre Laser, vol. 29, 1993.

Loh et al., Electronics Letters, Diode–Pumped Selfstarting Passively Mode Locked Neodymium–Doped Fibre Laser, vol. 29, 1993.

Nelson et al., Appl. Phys. Lett,. Broadly Tunable Sub–500 fs Pulses From an Additive–Pulse Mode–Locked Thulium––Doped Fiber Ring Laser, Lett. 67, 1995.

Ober and Hofer, Optics Letters, Self–Starting Diode–Pumped Femtosecond Nd Fiber Laser, vol. 18, 1993.

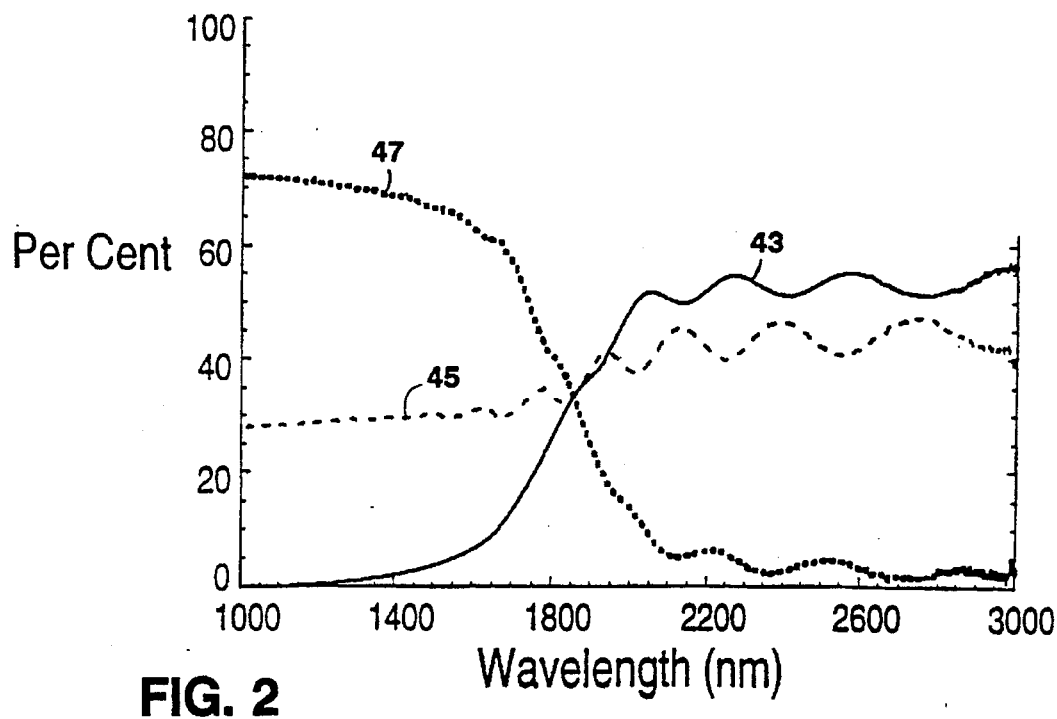
FIG. 2
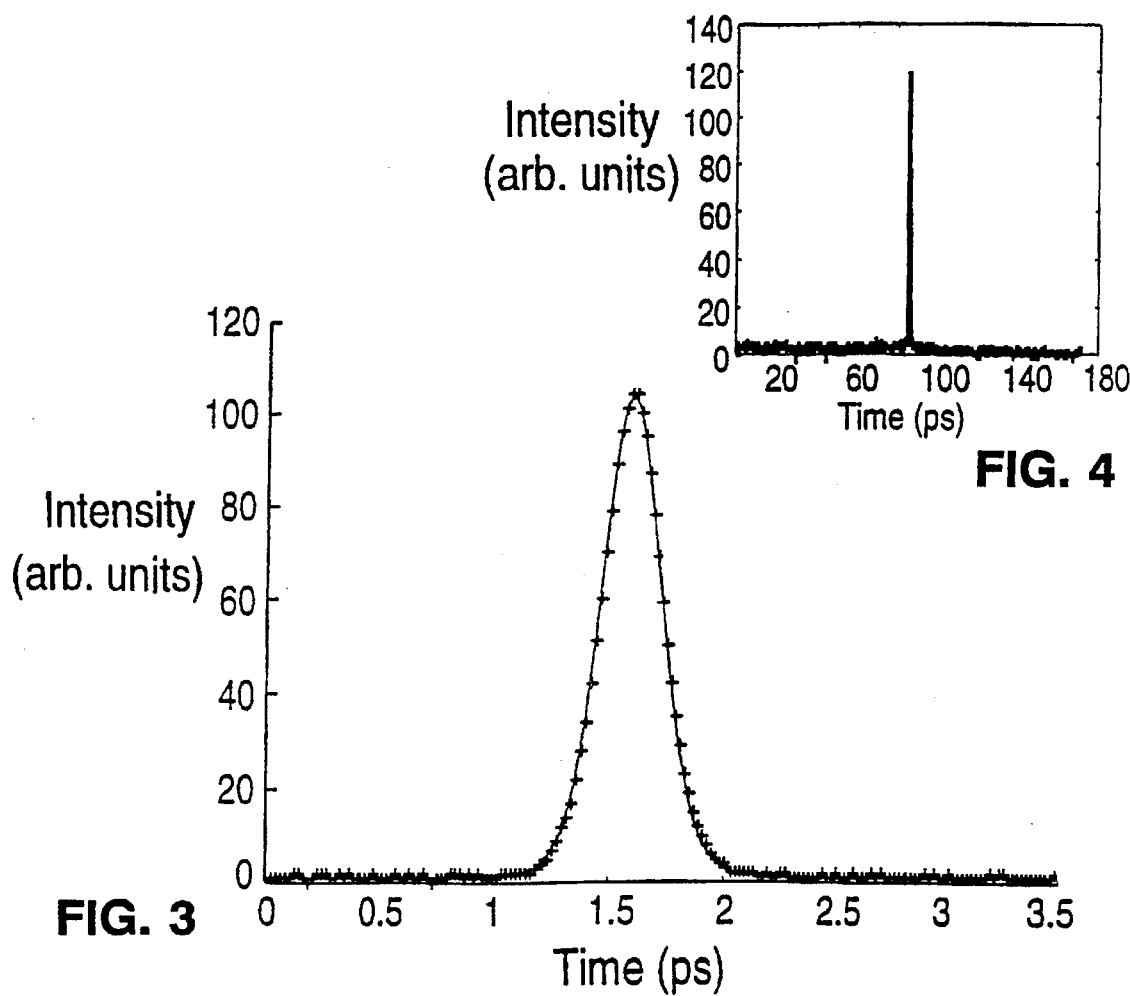
FIG. 3
FIG. 4

LASER HAVING A PASSIVE PULSE MODULATOR AND METHOD OF MAKING SAME

This invention was made with Government support under Contract No. F33615-92-C-1001 awarded by the Department of the Air Force. The Government has certain rights in this invention.

BACKGROUND OF THE INVENTION

This invention relates generally to lasers and more particularly to lasers having passive pulse modulators.

As is known in the art, lasers, which have been used in a wide range of applications, include a gain medium disposed in a resonant cavity having a pair of end reflectors, or mirrors. After pumping the gain medium with energy from an external source, such as a flash lamp or another laser, spontaneous emissions are produced in the gain medium. Various modes are then coherently sustained in resonance within the cavity by stimulated emission.

In high peak power lasers applications, various modulation techniques have been used to produce a train of pulses having high peak power. Such modulation techniques include gain switching, Q-switching, mode-locking, and combinations thereof. In applications requiring high operating efficiencies, it is desirable that the pulse modulation technique utilize little or no power. One such modulator is a passive, saturable absorber, such as a multiple quantum well (MQW) saturable absorber, as described in articles by U. Keller, D. A. B. Miller, G. D. Boyd, T. H. Chiu, J. F. Ferguson and Mt. T. Asom entitled: "Passively modelocked Nd:YLF and Nd:YAG lasers using a new intracavity anti-resonant semiconductor Fabry-Perot" published in the Advanced Solid State Lasers 1992 conference at Pd9-2 through Pd9-4; and, "Solid-state low-loss intracavity saturable absorber for Nd:YLF lasers: an antiresonant semiconductor Fabry-Perot saturable absorber", published in Optics Letters, Apr. 1, 1992, Vol. 17, No. 7 pages 505–507.

As is also known in the art, various techniques have been used to remove the light energy from the cavity. One technique uses a pair of mirrors at the ends of the cavity having very high, substantially total reflectivity, i.e., in the order of 99+% reflectivity. In such case, the output is taken from a point in the cavity between the pair of mirrors and a pair of outputs is produced. Such technique is described in the above referenced articles and with such described arrangement, the saturable absorber is fabricated on one of the pair of substantially totally reflecting mirrors. One technique used to form a reflective mirror is to form a distributed Bragg reflector. Such distributed Bragg reflector has a plurality of interleaved layers grown with different indices of reflection. However, in order to increase the amount of reflectivity, the number of layers grown must correspondingly increase.

In another technique, one of the pair of end mirrors is substantially totally reflective, as described above, to provide a rear reflector; however, the other end mirror has a reflectivity which is partially transmitting (e.g., 70 to 98% reflective) and provides the laser with a single ended output coupler. One such arrangement is described in an article entitled: "Passively Mode-Locked $Er^{3+}$ Fiber Laser Using a Semiconductor Nonlinear Mirror" by W. H. Lob, D. Atkinson, P. R. Morkel, M. Hopkinson, A. Rivers, A. J. Seeds. and D. N. Payne, published in IEEE Photonics Technology Letters, Vol. 5, No. 1, Jan. 1993, pages 35–37. In such described arrangement, the gain medium is a doped fiber. The laser resonator is formed by butting one end of the doped fiber against a 50% reflective output coupler, while light exiting the other end of the doped fiber is coupled to the saturable absorber through an all-fiber wavelength division multiplexer (WDM) spliced to such other end of the fiber. In another arrangement, the saturable absorber is fabricated on a substrate and the substrate, with the saturable absorber formed on it, is then placed, or directly mounted, onto the output coupler. Such technique is described in an article entitled "Saturable Absorber Modelocked Polarization Maintaining Erbium-Doped Fibre Laser" by E. A. De Souza, C. E. Soccolich, W. Pleibel, R. H. Stolen. J. R. Simpson and D. J. DiGiovanni. published in Electronics Letters, 4th Mar. 1993, Vol. 29, No. 5 pages 447–449.

As is also known in the art, the fabrication of the laser must be relatively simple. Thus, while the arrangements described above may be adequate in some application, such arrangements are not adequate in applications requiring relatively low cost lasers adapted to operate with a relatively high efficiency (i.e. 1% wall-plug efficiency) to produce pulses of light having pulse durations of the order of 190 fs with a wavelength between 1.8 and 2.0 µm from a pumping source having a threshold power of 18 mW.

SUMMARY OF THE INVENTION

In accordance with the present invention a laser is provided having a gain medium disposed in a resonant cavity having a pair of end reflectors. One of such reflectors has a reflectivity lower than the reflectivity of the other one of the reflectors. The reflectors are arranged to provide a single ended output for the cavity through the one of the reflectors having the lower reflectivity. A saturable absorber is formed on the one of the reflectors having the lower reflectivity.

With such an arrangement, fabrication of the saturable absorber on the single ended output coupler is greatly simplified.

In accordance with another feature of the invention, the gain medium is a doped fiber and the saturable absorber formed on the one of the reflectors having the lower reflectivity is affixed to an end of the doped fiber gain medium. With such an arrangement, a highly efficient, relatively low cost, mode locked laser is provided.

BRIEF DESCRIPTION OF THE DRAWING

Other features of the invention, as well as the invention itself, will become more readily apparent with reference to the following detailed description taken together with the accompanying drawings, wherein:

FIG. 2 is a curve showing infrared spectrophotometer results for a saturable absorber having a 75 period superlattice of crystallographic lattice-stained $In_yGa_{1-y}As$, where y=0.7, quantum wells integrally formed as a monolithic structure with crystallographic lattice-matched $In_xGa_{1-x}As$, where x=0.53, barrier layers formed on an InP substrate;

FIG. 3 is an expanded view of a digitized autocorrelation (i.e. + marks) and hyperbolic secant square fit (solid line) indicating a pulse duration of 190 femtoseconds (fs) produced by the thulium doped laser system of FIG. 1; and FIG. 4 is a 170 picoseconds (ps) digitized autocorrelation scan for the thulium doped laser of FIG. 1 at 22 mW launched pump power.

DESCRIPTION OF THE PREFERRED EMBODIMENTS

Figure 1:
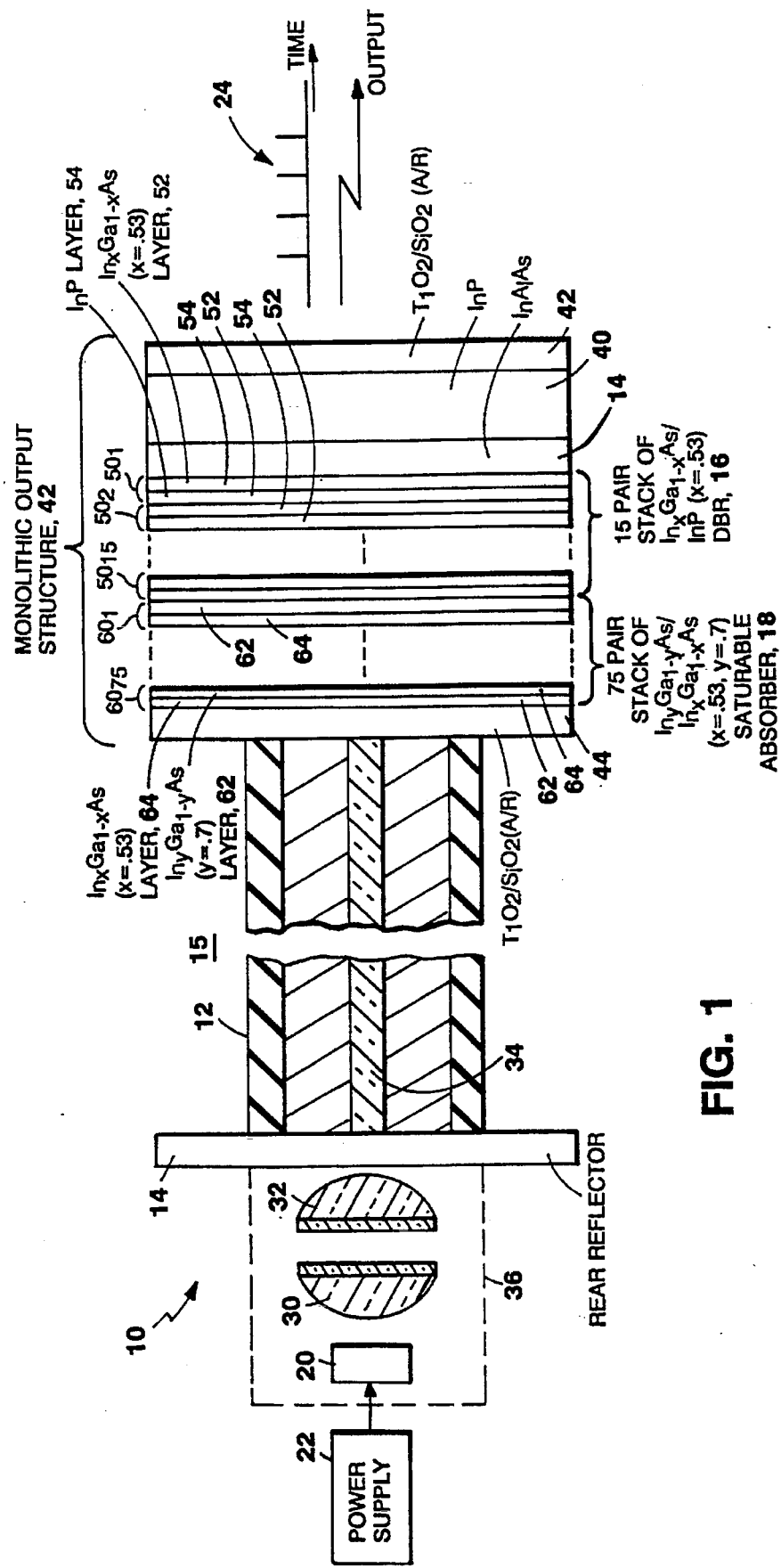
FIG. 1 is a schematic diagram of a self-starting, passively mode-locked thulium-doped-silica fiber laser system according to the invention.

Referring now to FIG. 1, a laser system is shown to include a laser 10 having a gain medium 12, here a thulium-doped silica fiber, disposed in a resonant cavity 15 having a pair of end reflectors 14, 16. One of the reflectors 14, 16, here end reflector 16 has a reflectivity lower than the reflectivity of the other one of the reflectors, here end reflector 14. The reflectors 14, 16 are arranged to provide a single ended output for the cavity 15 through the one of the reflectors 14, 16 having the lower reflectivity, here end reflector 16. Thus, the lower reflectivity reflector 16 provides the output coupler for the laser 10. A saturable absorber 18 is formed on the one of the reflectors 14, 16 having the lower reflectivity, i.e., on the reflector 16 providing the laser 10 output coupler. The laser system includes diode laser pump module 20 powered by a power supply 22, as shown. When powered by the power supply 22, the diode laser 20 injects light through the rear reflector 14 into the gain medium 12 to produce spontaneous emission of light. The saturable absorber 18 is constructed, in a manner to be described, to absorb emissions having a relatively low intensity prior to being reflected by the reflector 16 while passing without any substantial absorption relatively high intensity emissions to thereby sustain in resonance phase-locked resonant modes and produce a train of pulses 24 of light out of the laser 10 having a period corresponding to the round trip travel time through the resonant cavity 15.

More particularly, the diode pump laser 20 is a passively cooled, 50 mW, single-frequency diode laser 20 here emitting light near 786 nm. Attached to the output end of the diode laser 20 is a microlens, not shown, for circularizing the polarization of the emission. The microlens and a pair of aspherical lenses 30, 32 are arranged for focusing emitted light into the fiber core 34. The diode laser 20 and the two aspherical lenses 30, 32 are contained in a package 36 to provide rigid support and alignment capability an a coupling efficiency of about 80%.

The fiber core 34 is here fabricated by modified chemical vapor deposition (MCVD) and has the central 25% of the core thulium-doped to 19000 ppm to allow a relatively low threshold pumping. The fiber 12 has a numerical aperture of 0.37, cutoff wavelength of 1.37 μm, core diameter of 2.8 μm, $^3F_4$ fluorescence lifetime of 1 ms, and a small signal absorption coefficient of 0.5 dB/cm at 786 nm. Such fiber 12 is manufactured by Rutgers University, Fiber Optics Materials Research Program. P.O. Box 909, Pascataway, N.J., 08855-0909.

Mode locking, as noted above, is achieved with the saturable absorber 18. The absorber 18 is fabricated monolithically along with the DBR output coupler 16 by MOCVD (metal organic chemical vapor deposition) directly on a 2 inch diameter InP substrate 40. Thus, the saturable absorber 18 and DBR output coupler 16 are formed as an integral, monolithic output structure 42. Briefly, 15 pairs $50_1$–$50_{15}$ of quarter-wave thick layers of alternating lattice-matched $In_xGa_{1-x}As$, where x=0.53 and InP is deposited first as a distributed Bragg reflector (DBR) 16 having a reflectivity of 85% at 1.9 μm. That is, fifteen $In_xGa_{1-x}As$, where x=0.53, layers 52 are interleaved with fifteen layers 54 of InP, as shown, to provide the distributed Bragg reflector (DBR) 16.

The 15 pair DBR 16 is followed by a 75 pair $60_1$–$60_{75}$ superlattice of crystallographically strained layers 62 of $In_yGa_{1-y}As$, where y=0.70, quantum wells, (here each one of the layers 62 being 8 nm thick), and interleaved lattice-matched $In_xGa_{1-x}As$, where x=0.53 barrier layers 64 (here each one of the layers 64 being 28 nm thick). The band edge of the superlattice saturable absorber 18 is very near the desired wavelength of 1.9 μm. The superlattice saturable absorber 18 is proton-implanted at a dose of $1\times10^{13}/cm^2$ to further reduce carrier lifetime. Next, anti-reflection (AR) coatings 42, 44 at 1.8 to 2 μm are deposited via ion-beam sputter deposition on both sides to provide the monolithic structure 42.

The completed, passive mode-locker/output couplers, i.e., structure 42 is attached, saturable absorber 18 side towards the fiber 12, with a thin layer of index matching liquid, not shown, and thereby affixed to the fiber 12, by capillary forces. Here the index matching liquid is Immersion Liquid No. 06350, supplied by Cargille 55 Commerce Road Cedar Grove, N.J. 07009

Here, the length of the fiber 12 is a single clad fiber, 2 meters in length. Stable, single-pulse-in-the-cavity mode-locking was observed for the 2 meter long fiber laser gain medium utilizing a nanosecond response strained InGaAs detector, not shown. Lasing and mode-locking occurred above a virtually hysteresis-free threshold of approximately 18 mW of launched pumped power. Background-free second harmonic generation using $LiNbO_3$ doubling crystal was used to determine pulse duration. FIG. 2 is a curve showing infrared spectrophotometer results (i.e., transmission (curve 43), reflection (curve 45), and calculated absorption (curve 47)) for the saturable absorber 18 having a 75 period superlattice of crystallographic lattice-stained $In_yGa_{1-y}As$, where y=0.7, quantum wells integrally formed as a monolithic structure with crystallographic lattice-matched $In_xGa_{1-x}As$, where x=0.53, barrier layers formed on an InP substrate.

FIG. 3 shows intensity autocorrelation results, in arbitrary intensity units, for 22 mW of launched pump power, for which the laser delivers approximately 400 μW of output power at a 50 MHz pulse repetition rate. The hyperbolic secant pulse fit shown gives a full width at half maximum (FWHM) of 293 fs for the autocorrelation and 190 fs for the pulse. Similar performance was achieved at launched pump powers up to 30 mW, for which nearly 1 mW average power was produced at approximately 1% wall-plug efficiency. More particularly, FIG. 3 is an expanded view of a digitized autocorrelation (i.e. + marks) and hyperbolic secant square fit (solid line) indicating a pulse duration of 190 femtoseconds (fs) produced by the thulium doped laser system of FIG. 1. FIG. 4 shows a 170 picoseconds (ps) digitized autocorrelation scan for the thulium doped laser of FIG. 1 at 22 mW launched pump power.

The process for fabricating the saturable absorber/output coupler monolithic structure 42 will now be described in more detail. Thus, first InP substrate 40 is provided. Next, an InAlAs buffer layer 41 is epitaxially grown in a suitable epitaxial furnace, not shown, on the InP substrate 40 using low temperature MOCVD followed by a high temperature MOCVD epitaxially grown InAlAs buffer layer 41. Next, the 15 pairs $50_1$–$50_{15}$ of layers, each one of the pairs including a 1362 Å thick $In_xGa_{1-x}As$, where x=0.53 (i.e. lattice matched to the InP substrate) layer 52 and a 1515 Å thick InP layer 54. The 15 pairs $50_1$–$50_{15}$ of layers of 1362 Å thick $In_xGa_{1-x}As$, where x=0.53 are epitaxially grown in the same epitaxial furnace using MOCVD alternating with 1515 Å thick InP layers 54 to provide the distributed Bragg reflector (DBR) 16; i.e. a partially transmitting/partially reflecting mirror which provides the output coupler for the laser 10. The number of pairs in the DBR output coupler 16 can be modified to adjust mirror reflectivity and improve the performance of the laser 10. The thickness of the layers can be adjusted to change the peak reflection wavelength of the mirror, i.e., output coupler.

Next, a seventy-five pair saturable absorber structure $60_1$-$60_{75}$ is formed. Each one of the pairs $60_1$-$60_{75}$ includes a 280 Å thick layer 64 of $In_xGa_{1-x}As$, where x=0.53 (which is lattice matched to the InP substrate 40, and an 80 Å thick layer 62 of $In_yGa_{1-y}As$, where y=0.70 for strained material with a bandgap near 1.9 to 2 µm wavelength. These layers 62, 64 for each of the pairs $60_1$–$60_{75}$ are epitaxially grown in the same epitaxial furnace by MOCVD (i.e., without removal from the furnace) to form the quantum wells of the saturable absorber 18 integrally with the (DBR) output coupler 16. It is noted that the y value may be adjusted to move the wavelength of the bandgap (the larger the value of y, i.e., more strain, will move the bandgap to longer wavelengths). Quantum well and barrier thickness can be adjusted and alternate barrier materials can be used to move the bandgap around as well. It should be noted that while MOCVD was used in the steps described to form the monolithic DBR output coupler/saturable absorber, MBE (molecular beam epitaxial) processing may also be used.

Next, protons are implanted into the quantum well saturable absorber to reduce carrier lifetime. Here, the proton ion-implantation ($^1H^+$) is performed by IICO 3050 Oakmead Village Drive Santa Clara, Calif. 95051, with a dose of $1\times10^{13}/cm^2$ at an energy level of 200 keV. Alternatively, the quantum well materials may be grown at low temperature to create defects that will decrease carrier lifetime.

Next, the back side of the InP substrate 40 (i.e., the non-epitaxial growth side) is polished to leave a high surface quality. Next, anti-reflection coatings 44, 46 are deposited, here by ion beam sputter deposition, on each outer surfaces to form the monolithic saturable absorber/DBR output coupler structure 42, here using $TiO_2/SiO_2$ thin film structures. The anti-reflection coating surface 44 is then butt-coupled, i.e., affixed in abutment to, the laser gain medium 12, here the thulium-doped silica fiber, as described above.

The rear reflector 14 is antireflecting at 786 nm and has a maximum reflectivity at 1.8–2 µm. The A/R reflectors 42 are, as described above, antireflecting at 1.8–2 µm.

Other embodiments are within the spirit and scope of the appended claims. For example, the anti-reflection coating surface butt-coupled to the laser gain medium may be made highly reflective at the pumped wavelength of the diode laser to prevent residual, unabsorbed pump radiation from saturating the absorber; however, the laser described above did not include such a reflective coating at the diode laser wavelength. The inner anti-reflective coating may be partially reflective at the laser wavelength to modify the laser intensity required to saturate the absorber; however, the laser described above did not include such a partially reflective coating.

What is claimed is:

1. A laser, comprising:

a pair of end reflectors;

a resonant cavity having a gain medium disposed therein between the pair of end reflectors;

one of such reflectors having a reflectivity lower than the reflectivity of the other one of the reflectors;

the reflectors being arranged to provide a single ended output for the cavity through the one of the reflectors having the lower reflectivity; and a saturable absorber integrally formed on the one of the reflectors having the lower reflectivity, affixed to an end of the doped fiber gain medium.

2. The laser recited in claim 1 wherein the gain medium is a doped fiber and the saturable absorber formed on the one of the reflectors having the lower reflectivity is affixed to an end of the doped fiber gain medium.

3. The laser recited in claim 2 wherein the gain medium comprises a thulium-doped silica fiber.

4. The laser recited in claim 3 including a diode pump laser arranged to pump the laser gain medium into spontaneous emission.

5. The laser recited in claim 4 wherein the diode laser is single-frequency diode laser.

6. The laser recited in claim 5 wherein the diode laser emits light having a wavelength in the order of 786 nm.

7. The laser recited in claim 6 wherein the diode laser produced light having a power level in the order of 50 mW.

8. The laser recited in claim 6 including a microlens attached to an output end of the diode laser.

9. The laser recited in claim 3 wherein the fiber is here fabricated by modified chemical deposition (MCVD) and has the central 25% of the core thulium-doped to 19000 ppm.

10. The laser recited in claim 9 wherein the fiber has a numerical aperture of 0.37, cutoff wavelength of 1.37 µm, core diameter of 2.8 µm, $^3F_4$ fluorescence lifetime of 1 ms, and a small signal absorption coefficient of 0.5 dB/cm at 786 nm.

11. A laser, comprising:

a pair of end reflectors;

a resonant cavity having a gain medium disposed therein between the pair of end reflectors;

one of such reflectors having a reflectivity lower than the reflectivity of the other one of the reflectors to provide a output coupler for the laser;

a saturable absorber integrally formed with the output coupler as a single monolithic structure.

12. The laser recited in claim 11 wherein the gain medium is a doped fiber and the monolithic structure is affixed directly to an end of the doped fiber gain medium.

13. The laser recited in claim 12 wherein the output coupler comprises a distributed Bragg reflector.

14. The laser recited in claim 13 wherein the distributed Bragg reflector comprises:

an InP substrate;

a plurality of pairs of quarter-wave thick layers of alternating lattice-matched $In_xGa_{1-x}As$, where x=0.53, and InP.

15. The laser recited in claim 14 wherein the saturable absorber comprises:

a plurality of pairs of a layers of strained $In_yGa_{1-y}As$ quantum wells and lattice matched barrier layers epitaxially deposited on the distributed Bragg reflector.

16. The laser recited in claim 15 where y=0.70.

17. The laser recited in claim 16 wherein the laser emits pulses of light having a wavelength between 1.8–2.0 µm and wherein the band edge of the superlattice of the saturable absorber is very near the wavelength of the pulses emitted by the laser.

18. The laser recited in claim 17 including anti-reflection coatings at 1.8 to 2 µm disposed on the monolithic structure.

19. A method of forming an output structure and saturable absorber, comprising the steps of:

providing a semiconductor substrate;

epitaxially growing substrate a plurality of pairs of layers of material lattice matched to the substrate to provide a distributed Bragg reflector output structure;

epitaxially forming on the distributed Bragg reflector output structure a plurality of pairs of layers of material to form a saturable absorber integrally with the distributed Bragg reflector output structure.

20. The method recited in claim 19 including additionally the step of affixing, in abutment to, a laser gain medium.

21. The method recited in claim 20 wherein the gain medium is a doped silica fiber.

22. The method recited in claim 21 wherein the substrate is III-V material.

23. The method recited in claim 22 wherein the doped fiber is thulium doped.

24. The method recited in claim 19 wherein at least one of the layers is crystallographically strained with respect to the substrate.

25. The laser recited in claim 13 wherein the distributed Bragg reflector comprises:

a substrate;

a plurality of pairs of quarter-wave thick layers of alternating layers of material lattice-matched to the substrate; and wherein the saturable absorber comprises:

a plurality of pairs of layers, each one of the pairs including a quantum well layer and a barrier layer, such plurality of layers being epitaxially deposited on the distributed Bragg reflector.

26. The laser recited in claim 25 wherein one of the layers in each one of the pairs of layers of the saturable absorer is a crystallographically strained layer.

* * * * *